(12) United States Patent
Luo et al.

(10) Patent No.: US 6,282,317 B1
(45) Date of Patent: Aug. 28, 2001

(54) METHOD FOR AUTOMATIC DETERMINATION OF MAIN SUBJECTS IN PHOTOGRAPHIC IMAGES

(75) Inventors: Jiebo Luo, Pittsford; Stephen Etz, Fairport; Amit Singhal, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/223,860

(22) Filed: Dec. 31, 1998

(51) Int. Cl.$^7$ ..................................................... G06K 9/46
(52) U.S. Cl. .............................................................. 382/203
(58) Field of Search ................................... 382/203, 204, 382/205, 206, 207, 168, 169, 173, 218, 195, 155, 156, 159, 160, 190, 202, 227

(56) References Cited

U.S. PATENT DOCUMENTS

| | | | |
|---|---|---|---|
| 4,975,975 | * 12/1990 | Filipski | 382/38 |
| 5,724,456 | 3/1998 | Boyack et al. | 382/274 |
| 5,809,322 | * 9/1998 | Akerib | 395/800.14 |
| 5,850,352 | * 12/1998 | Moezzi et al. | 364/514 |
| 5,862,260 | * 1/1999 | Rhoads | 382/232 |
| 5,983,218 | * 11/1999 | Syeda-Mahmood | 707/104 |
| 6,014,461 | * 1/2000 | Hennessey et al. | 382/195 |

OTHER PUBLICATIONS

V. D. Gesu, et al., "Local Operators to detect regions of interest," *Pattern Recognition Letters*, vol. 18, pp. 1077–1081, 1977.

R. Milanese, *Detecting salient regions in an image: From biological evidence to computer implementations*, PhD thesis, University of Geneva, Switzerland, 1993.

X. Marichal, et al., "Automatic detection of interest areas of an image or of a sequence of images," in *Proc. IEEE Int. Conf. Image Process*, 1996.

W. Osberger, et al., "Automatic identification of perpetually important regions in an image," in *Proc. IEEE Int. Conf. Pattern Recognition*, 1998.

Q. Huang, et al., "Foreground/background segmentation of color images by integration of multiple cues," in *Proc. IEEE Int. Conf. Image Process.*, 1995.

T. F. Syeda–Mahmood, "Data and model–driven selection using color regions," *Int. J. Comput. Vision*, vol. 21, No. 1, pp. 9–36, 1997.

Luo, et al., "Towards physics–based segmentation of photographic color images," *Proceedings of the IEEE International Conference on Image Processing*, 1997.

L. R. Williams, "Perceptual organization of occluding contours," in *Proc. IEEE Int. Conf. Computer Vision*, 1990.

J. August, et al., "Fragment grouping via the principle of perceptual occlusion," in *Proc. IEEE Int. Conf. Pattern Recognition*, 1996.

Lee, "Color image quantization based on physics and psychophysics," *Journal of Society of Photographic Science and Technology of Japan*, vol. 59, No. 1, pp. 212–225, 1996.

J. Pearl, *Probabilistic Reasoning in Intelligent Systems*, San Francisco, CA: Morgan Kauffmann, 1988.

* cited by examiner

*Primary Examiner*—Andrew W. Johns
*Assistant Examiner*—Seyed Azarian
(74) *Attorney, Agent, or Firm*—David M. Woods

(57) ABSTRACT

A method for detecting a main subject in an image, the method comprises: receiving a digital image; extracting regions of arbitrary shape and size defined by actual objects from the digital image; grouping the regions into larger segments corresponding to physically coherent objects; extracting for each of the regions at least one structural saliency feature and at least one semantic saliency feature; and integrating saliency features using a probabilistic reasoning engine into an estimate of a belief that each region is the main subject.

37 Claims, 9 Drawing Sheets

METHOD FOR AUTOMATIC DETERMINATION OF MAIN SUBJECTS IN PHOTOGRAPHIC IMAGES

FIELD OF THE INVENTION

The invention relates generally to the field of digital image processing and, more particularly, to locating main subjects, or equivalently, regions of photographic interest in a digital image.

BACKGROUND OF THE INVENTION

In photographic pictures, a main subject is defined as what the photographer tries to capture in the scene. The first-party truth is defined as the opinion of the photographer and the third-party truth is defined as the opinion from an observer other than the photographer and the subject (if applicable). In general, the first-party truth typically is not available due to the lack of specific knowledge that the photographer may have about the people, setting, event, and the like. On the other hand, there is, in general, good agreement among third-party observers if the photographer has successfully used the picture to communicate his or her interest in the main subject to the viewers. Therefore, it is possible to design a method to automatically perform the task of detecting main subjects in images.

Main subject detection provides a measure of saliency or relative importance for different regions that are associated with different subjects in an image. It enables a discriminative treatment of the scene contents for a number of applications. The output of the overall system can be modified versions of the image, semantic information, and action.

The methods disclosed by the prior art can be put in two major categories. The first category is considered "pixel-based" because such methods were designed to locate interesting pixels or "spots" or "blocks", which usually do not correspond to entities of objects or subjects in an image. The second category is considered "region-based" because such methods were designed to locate interesting regions, which correspond to entities of objects or subjects in an image.

Most pixel-based approaches to region-of-interest detection are essentially edge detectors. V. D. Gesu, et al., "Local operators to detect regions of interest," *Pattern Recognition Letters*, vol. 18, pp. 1077–1081, 1997, used two local operators based on the computation of local moments and symmetries to derive the selection. Arguing that the performance of a visual system is strongly influenced by information processing done at early vision stage, two transforms named the discrete moment transform (DMT) and discrete symmetry transform (DST) are computed to measure local central moments about each pixel and local radial symmetry. In order to exclude trivial symmetry cases, nonuniform region selection is needed. The specific DMT operator acts like a detector of prominent edges (occlusion boundaries) and the DST operator acts like a detector of symmetric blobs. The results from the two operators are combined via logic "AND" operation. Some morphological operations are needed to dilate the edge-like raw output map generated by the DMT operator.

R. Milanese, Detecting salient regions in an image: From biology to implementation, PhD thesis, University of Geneva, Switzerland, 1993, developed a computational model of visual attention, which combines knowledge about the human visual system with computer vision techniques. The model is structured into three major stages. First, multiple feature maps are extracted from the input image (for examples, orientation, curvature, color contrast and the like). Second, a corresponding number of "conspicuity" maps are computed using a derivative of Gaussian model, which enhance regions of interest in each feature map. Finally, a nonlinear relaxation process is used to integrate the conspicuity maps into a single representation by finding a compromise among inter-map and intra-map inconsistencies. The effectiveness of the approach was demonstrated using a few relatively simple images with remarkable regions of interest.

To determine an optimal tonal reproduction, J. R. Boyack, et al., U.S. Pat. No. 5,724,456, developed a system that partitions the image into blocks, combines certain blocks into sectors, and then determines a difference between the maximum and minimum average block values for each sector. A sector is labeled an active sector if the difference exceeds a pre-determined threshold value. All weighted counts of active sectors are plotted versus the average luminance sector values in a histogram, which is then shifted via some predetermined criterion so that the average luminance sector value of interest will fall within a destination window corresponding to the tonal reproduction capability of a destination application.

In summary, this type of pixel-based approach does not explicitly detect region of interest corresponding to semantically meaningful subjects in the scene. Rather, these methods attempt to detect regions where certain changes occur in order to direct attention or gather statistics about the scene.

X. Marichal, et al., "Automatic detection of interest areas of an image or of a sequence of images," in *Proc. IEEE Int. Conf. Image Process.*, 1996, developed a fuzzy logic-based system to detect interesting areas in a video sequence. A number of subjective knowledge-based interest criteria were evaluated for segmented regions in an image. These criteria include: (1) an interaction criterion (a window predefined by a human operator); (2) a border criterion (rejecting of regions having large number of pixels along the picture borders); (3) a face texture criterion (de-emphasizing regions whose texture does not correspond to skin samples); (4) a motion criterion (rejecting regions with no motion and low gradient or regions with very large motion and high gradient); and (5) a continuity criterion (temporal stability in motion). The main application of this method is for directing the resources in video coding, in particular for videophone or videoconference. It is clear that motion is the most effective criterion for this technique targeted at video instead of still images. Moreover, the fuzzy logic functions were designed in an ad hoc fashion. Lastly, this method requires a window predefined by a human operator, and therefore is not fully automatic.

W. Osberger, et al., "Automatic identification of perceptually important regions in an image," in *Proc. IEEE Int. Conf. Pattern Recognition*, 1998, evaluated several features known to influence human visual attention for each region of a segmented image to produce an importance value for each feature in each region. The features mentioned include low-level factors (contrast, size, shape, color, motion) and higher level factors (location, foreground/background, people, context), but only contrast, size, shape, location and foreground/background (determining background by determining the proportion of total image border that is contained in each region) were implemented. Moreover, this method chose to treat each factor as being of equal importance by arguing that (1) there is little quantitative data which indicates the relative importance of these different factors and (2) the relative importance is likely to change from one image to another. Note that segmentation was obtained using the split-and-merge method based on 8×8 image blocks and this segmentation method often results in over-segmentation and blotchiness around actual objects.

Q. Huang, et al., "Foreground/background segmentation of color images by integration of multiple cues," in *Proc. IEEE Int. Conf. Image Process.*, 1995, addressed automatic segmentation of color images into foreground and background with the assumption that background regions are relatively smooth but may have gradually varying colors or be lightly textured. A multi-level segmentation scheme was devised that included color clustering, unsupervised segmentation based on MDL (Minimum Description Length) principle, edge-based foreground/background separation, and integration of both region and edge-based segmentation. In particular, the MDL-based segmentation algorithm was used to further group the regions from the initial color clustering, and the four corners of the image were used to adaptively determine an estimate of the background gradient magnitude. The method was tested on around 100 well-composed images with prominent main subject centered in the image against large area of the assumed type of uncluttered background.

T. F. Syeda-Mahmood, "Data and model-driven selection using color regions," *Int. J. Comput. Vision*, vol. 21, no. 1, pp. 9–36, 1997, proposed a data-driven region selection method using color region segmentation and region-based saliency measurement. A collection of 220 primary color categories was pre-defined in the form of a color LUT (look-up-table). Pixels are mapped to one of the color categories, grouped together through connected component analysis, and further merged according to compatible color categories. Two types of saliency measures, namely self-saliency and relative saliency, are linearly combined using heuristic weighting factors to determine the overall saliency. In particular, self-saliency included color saturation, brightness and size while relative saliency included color contrast (defined by CIE distance) and size contrast between the concerned region and the surrounding region that is ranked highest among neighbors by size, extent and contrast in successive order.

In summary, almost all of these reported methods have been developed for targeted types of images: video-conferencing or TV news broadcasting images, where the main subject is a talking person against a relatively simple static background (Osberg, Marichal); museum images, where there is a prominent main subject centered in the image against large area of relatively clean background (Huang); and toy-world images, where the main subject are a few distinctively colored and shaped objects (Milanese, Syeda). These methods were either not designed for unconstrained photographic images, or even if designed with generic principles were only demonstrated for their effectiveness on rather simple images. The criteria and reasoning processes used were somewhat inadequate for less constrained images, such as photographic images.

SUMMARY OF THE INVENTION

It is an object of this invention to provide a method for detecting the location of main subjects within a digitally captured image and thereby overcoming one or more problems set forth above.

It is also an object of this invention to provide a measure of belief for the location of main subjects within a digitally captured image and thereby capturing the intrinsic degree of uncertainty in determining the relative importance of different subjects in an image. The output of the algorithm is in the form of a list of segmented regions ranked in a descending order of their likelihood as potential main subjects for a generic or specific application. Furthermore, this list can be converted into a map in which the brightness of a region is proportional to the main subject belief of the region.

It is also an object of this invention to use ground truth data. Ground truth, defined as human outlined main subjects, is used to feature selection and training the reasoning engine.

It is also an object of this invention to provide a method of finding main subjects in an image in an automatic manner.

It is also an object of this invention to provide a method of finding main subjects in an image with no constraints or assumptions on scene contents.

It is further an object of the invention to use the main subject location and main subject belief to obtain estimates of the scene characteristics.

The present invention comprises the steps of:
a) receiving a digital image;
b) extracting regions of arbitrary shape and size defined by actual objects from the digital image;
c) grouping the regions into larger segments corresponding to physically coherent objects;
d) extracting for each of the regions at least one structural saliency feature and at least one semantic saliency feature; and,
e) integrating saliency features using a probabilistic reasoning engine into an estimate of a belief that each region is the main subject.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the following advantages of:
a robust image segmentation method capable of identifying object regions of arbitrary shapes and sizes, based on physics-motivated adaptive Bayesian clustering and non-purposive grouping;
emphasis on perceptual grouping capable of organizing regions corresponding to different parts of physically coherent subjects;
utilization of a non-binary representation of the ground truth, which capture the inherent uncertainty in determining the belief of main subject, to guide the design of the system;
a rigorous, systematic statistical training mechanism to determine the relative importance of different features through ground truth collection and contingency table building;
extensive, robust feature extraction and evidence collection;
combination of structural saliency and semantic saliency, the latter facilitated by explicit identification of key foreground- and background- subject matters;
combination of self and relative saliency measures for structural saliency features; and,
a robust Bayes net-based probabilistic inference engine suitable for integrating incomplete information.

BRIEF DESCRIPTION OF THE DRAWINGS

FIG. 4 is an illustration of the location PDF with unknown-orientation.

FIG. 5 is an illustration of the location PDF with known-orientation.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
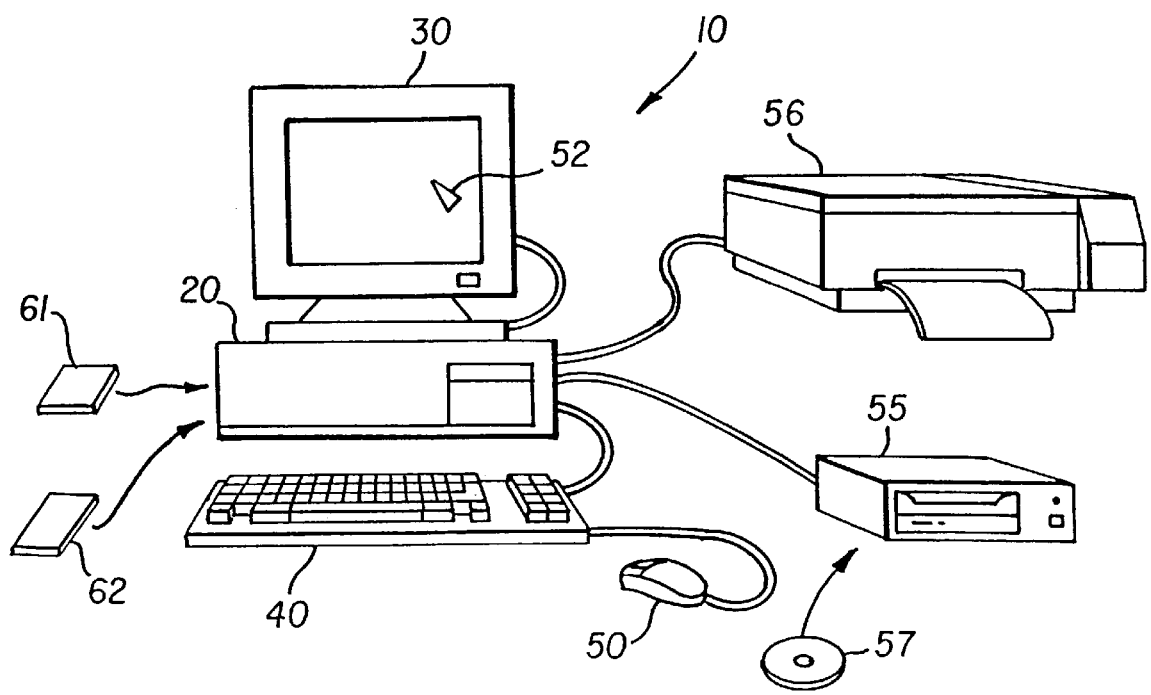
FIG. 1 is a perspective view of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor based unit 20 for receiving and processing software programs and for performing other processing functions. A touch screen display 30 is electrically connected to the microprocessor based unit 20 for displaying user related information associated with the software, and for receiving user input via touching the screen. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57, which typically includes a software program. In addition, a floppy disk 61 may also include a software program, and is inserted into the microprocessor based unit 20 for inputting the software program. Still further, the microprocessor based unit 20 may be programmed, as is well know in the art, for storing the software program internally. A printer 56 is connected to the microprocessor based unit 20 for printing a hardcopy of the output of the computer system 10.

Images may also be displayed on the display 30 via a personal computer card (PC card) 62 or, as it was formerly known, a personal computer memory card international association card (PCMCIA card) which contains digitized images electronically embodied the card 62. The PC card 62 is ultimately inserted into the microprocessor based unit 20 for permitting visual display of the image on the display 30.

Figure 2:
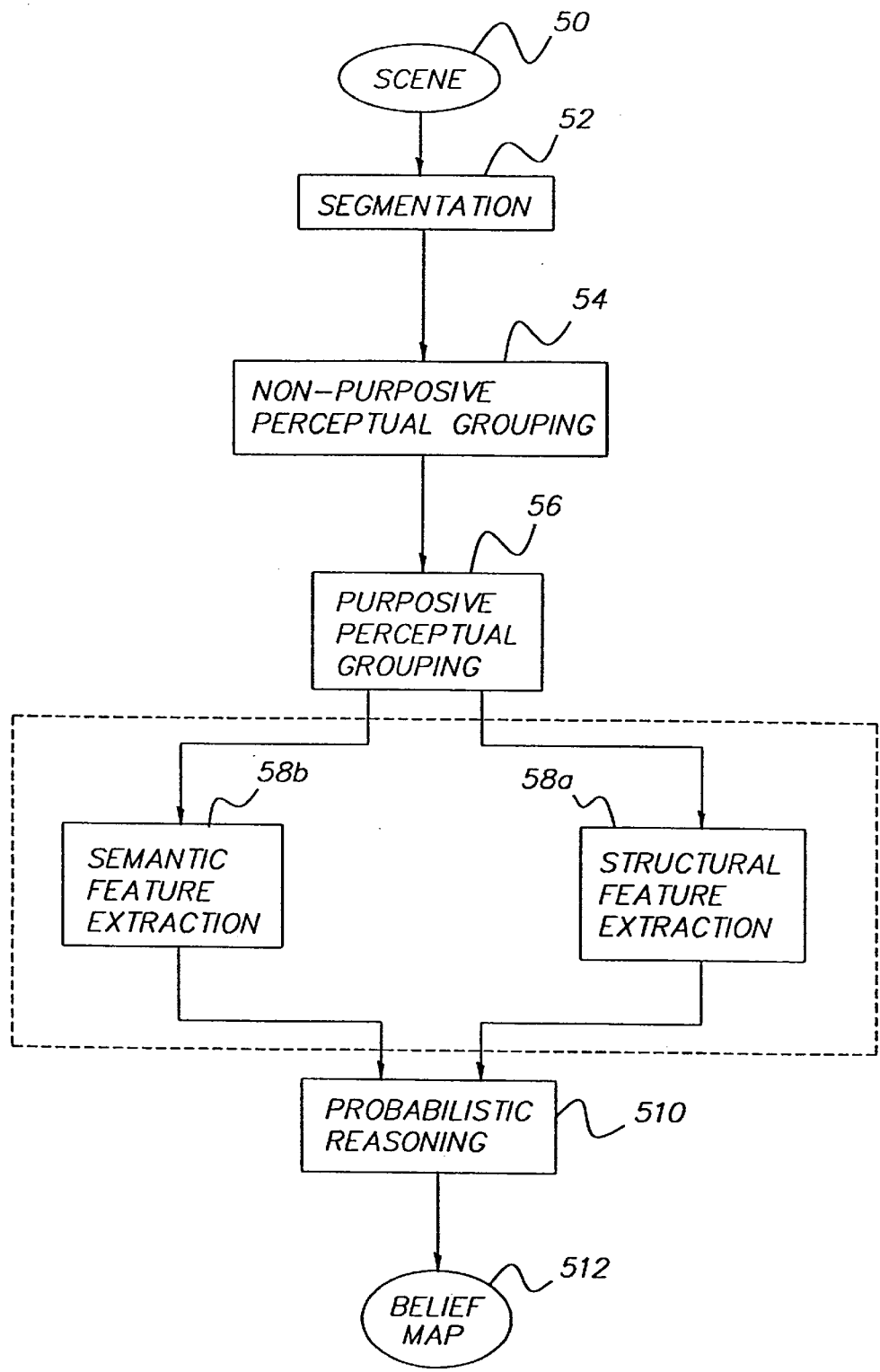
FIG. 2 is a block diagram illustrating a software program of the present invention.

Referring to FIG. 2, there is shown a block diagram of an overview of the present invention. First, an input image of a natural scene is acquired and stored S0 in a digital form. Then, the image is segmented S2 into a few regions of homogeneous properties. Next, the region segments are grouped into larger regions based on similarity measures S4 through non-purposive perceptual grouping, and further grouped into larger regions corresponding to perceptually coherent objects S6 through purposive grouping (purposive grouping concerns specific objects). The regions are evaluated for their saliency S8 using two independent yet complementary types of saliency features—structural saliency features and semantic saliency features. The structural saliency features, including a set of low-level early vision features and a set of geometric features, are extracted S8a, which are further processed to generate a set of self-saliency features and a set of relative saliency features. Semantic saliency features in the forms of key subject matters, which are likely to be part of either foreground (for example, people) or background (for example, sky, grass), are detected S8b to provide semantic cues as well as scene context cues. The evidences of both types are integrated S10 using a reasoning engine based on a Bayes net to yield the final belief map of the main subject S12.

To the end of semantic interpretation of images, a single criterion is clearly insufficient. The human brain, furnished with its a priori knowledge and enormous memory of real world subjects and scenarios, combines different subjective criteria in order to give an assessment of the interesting or primary subject(s) in a scene. The following extensive list of features are believed to have influences on the human brain in performing such a somewhat intangible task as main subject detection: location, size, brightness, colorfulness, texturefulness, key subject matter, shape, symmetry, spatial relationship (surroundedness/occlusion), bordemess, indoor/outdoor, orientation, depth (when applicable), and motion (when applicable for video sequence).

In the present invention, the low-level early vision features include color, brightness, and texture. The geometric features include location (centrality), spatial relationship (borderness, adjacency, surroundedness, and occlusion), size, shape, and symmetry. The semantic features include flesh, face, sky, grass, and other green vegetation. Those skilled in the art can define more features without departing from the scope of the present invention.

S2: Region Segmentation

The adaptive Bayesian color segmentation algorithm (Luo et al., "Towards physics-based segmentation of photographic color images," Proceedings of the IEEE International Conference on Image Processing, 1997) is used to generate a tractable number of physically coherent regions of arbitrary shape. Although this segmentation method is preferred, it will be appreciated that a person of ordinary skill in the art can use a different segmentation method to obtain object regions of arbitrary shape without departing from the scope of the present invention. Segmentation of arbitrarily shaped regions provides the advantages of: (1) accurate measure of the size, shape, location of and spatial relationship among objects; (2) accurate measure of the color and texture of objects; and (3) accurate classification of key subject matters.

Figure 8:
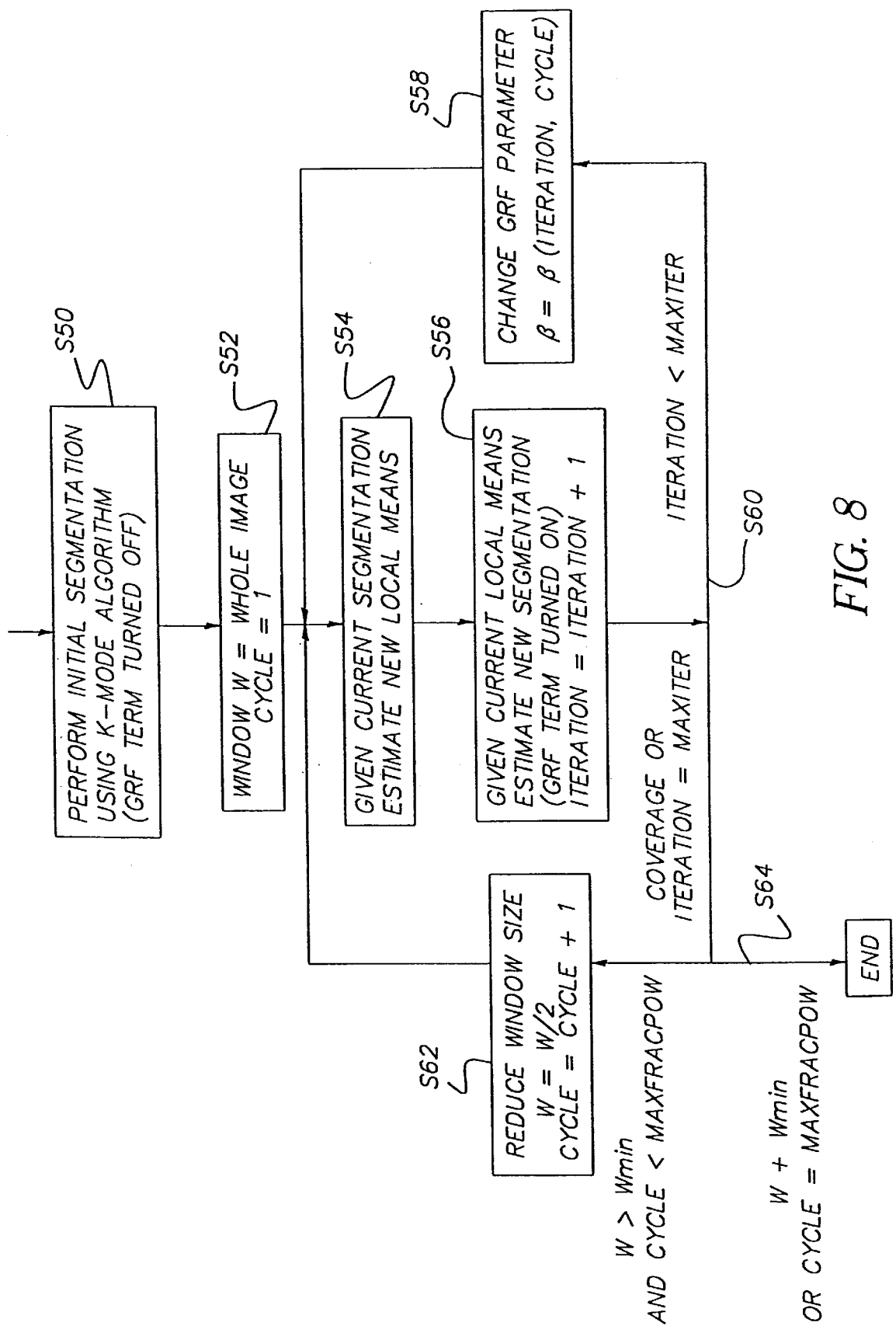

Referring to FIG. 8, there is shown a block diagram of the preferred segmentation algorithm. First, an initial segmentation of the image into regions is obtained S50. A color histogram of the image is computed and then partitioned into a plurality of clusters that correspond to distinctive, prominent colors in the image. Each pixel of the image is classified to the closest cluster in the color space according to a preferred physics-based color distance metric with respect to the mean values of the color clusters (Luo et al., "Towards physics-based segmentation of photographic color images," Proceedings of the IEEE International Conference on Image Processing, 1997). This classification process results in an initial segmentation of the image. A neighborhood window is placed at each pixel in order to determine what neighborhood pixels are used to compute the local color histogram for this pixel. The window size is initially set at the size of the entire image S52, so that the local color histogram is the same as the one for the entire image and does not need to be recomputed. Next, an iterative procedure is performed between two alternating processes: re-computing S54 the local mean values of each color class based on the current segmentation, and re-classifying the pixels according to the updated local mean values of color classes S56. This iterative procedure is performed until a convergence is reached S60. During this iterative procedure, the strength of the spatial constraints can be adjusted in a gradual manner S58 (for example, the value of β, which indicates the strength of the spatial constraints, is increased linearly with each iteration). After the convergence is reached for a particular window size, the window used to estimate the local mean values for color classes is reduced by half in size S62. The iterative procedure is repeated for the reduced window size to allow more accurate estimation of the local mean values for color classes. This mechanism introduces spatial adaptivity into the segmentation process. Finally, segmentation of the image is obtained when the iterative procedure reaches convergence for the minimum window size S64.

S4 & S6: Perceptual Grouping

The segmented regions may be grouped into larger segments that consist of regions that belong to the same object. Perceptual grouping can be non-purposive and purposive. Referring to FIG. 2, non-purposive perceptual grouping S4 can eliminate over-segmentation due to large illumination differences, for example, a table or wall with remarkable illumination falloff over a distance. Purposive perceptual grouping S6 is generally based on smooth, noncoincidental connection of joints between parts of the same object, and in certain cases models of typical objects (for example, a person has head, torso and limbs).

Perceptual grouping facilitates the recognition of high-level vision features. Without proper perceptual grouping, it is difficult to perform object recognition and proper assessment of such properties as size and shape. Perceptual grouping includes: merging small regions into large regions based on similarity in properties and compactness of the would-be merged region (non-purposive grouping); and grouping parts that belong to the same object based on commonly shared background, compactness of the would-be merged region, smoothness in contour connection between regions, and model of specific object (purposive grouping).

S8: Feature Extraction

Figure 3:
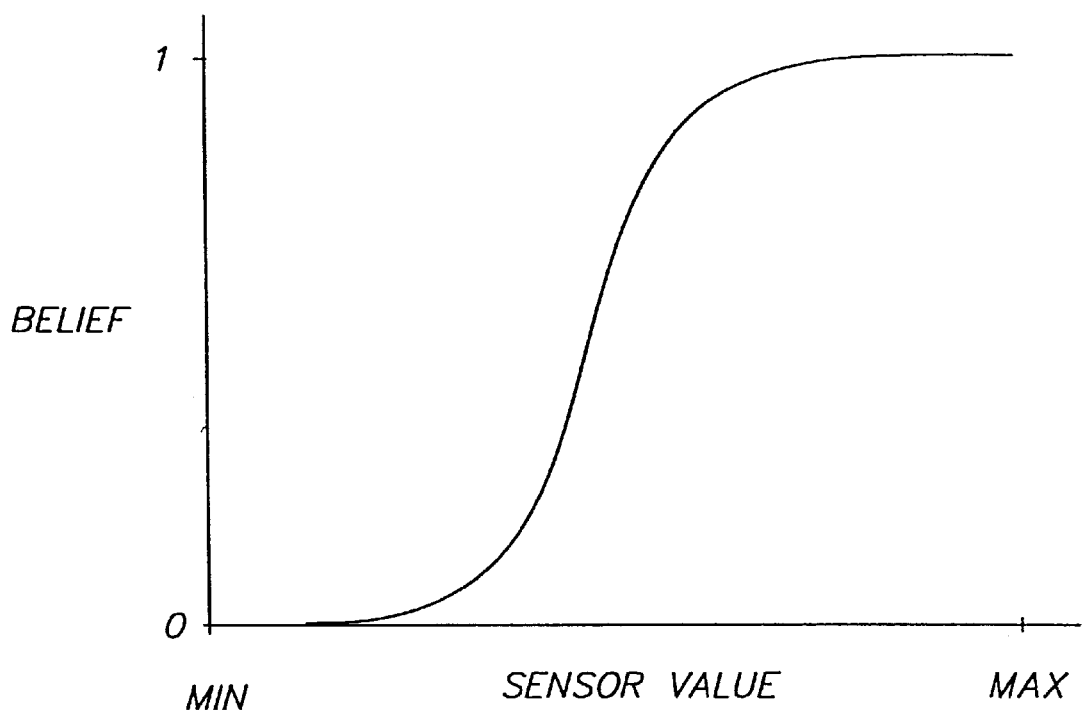
FIG. 3 is an illustration of the sensitivity characteristic of a belief sensor with sigmoidal shape used in the present invention.

For each region, an extensive set of features, which are shown to contribute to visual attention, are extracted and associated evidences are then computed. The list of features consists of three categories—low-level vision features, geometric features, and semantic features. For each feature, either or both of a self-saliency feature and a relative saliency feature are computed. The self-saliency is used to capture subjects that stand out by themselves (for example, in color, texture, location and the like), while the relative saliency is used to capture subjects that are in high contrast to their surrounding (for example, shape). Furthermore, raw measurements of features, self-salient or relatively salient, are converted into evidences, whose values are normalized to be within [0, 1.0], by belief sensor functions with appropriate nonlinearity characteristics. Referring to FIG. 3, there is shown a sigmoid-shaped belief sensor function used in the present invention. A raw feature measurement that has a value between a minimum value and a maximum value is mapped to a belief value within [0, 1]. A Gaussian-shaped belief sensor function (not shown) is also used for some features, as will be described hereinbelow.

Structural Saliency Features

Structural saliency features include individually or in combination self saliency features and relative saliency features.

Figure 6:
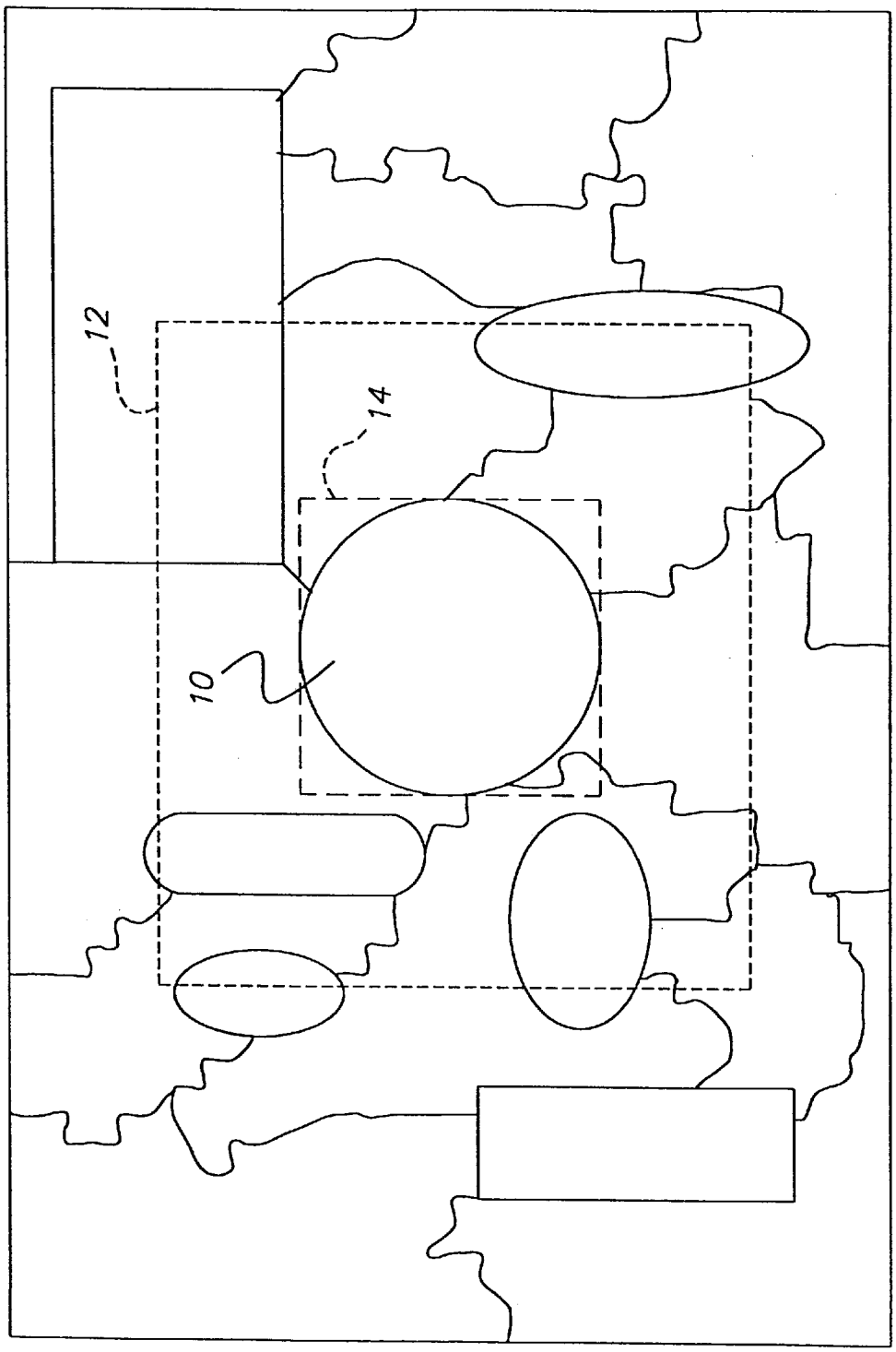
FIG. 6 is an illustration of the computation of relative saliency for the central circular region using an extended neighborhood as marked by the box of dotted line.

Referring to FIG. 6, an extended neighborhood is used to compute relative saliency features. First, a minimum bounding rectangle (MBR) 14 of a region of concern 10 (shown by the central circular region) is determined. Next, this MBR is extended in all four directions (stopping at the image borders wherever applicable) of the region using an appropriate factor (for example, 2). All regions intersecting this stretched MBR 12, which is indicated by the dotted lines, are considered neighbors of the region. This extended neighborhood ensures adequate context as well natural scalability for computing the relative saliency features.

The following structural saliency features are computed:

contrast in hue (a relative saliency feature)

In terms of color, the contrast in hue between an object and its surrounding is a good indication of the saliency in color.

$$contrast_{color} = \sum_{neighborhood} \frac{\|hue - hue_{surrounding}\|}{hue_{surrounding}} \quad (1)$$

where the neighborhood refers to the context previously defined and henceforth.

colorfulness (a self-saliency feature) and contrast in colorfulness (a relative saliency feature)

In terms of colorfulness, the contrast between a colorful object and a dull surrounding is almost as good an indicator as the contrast between a dull object and a colorful surrounding. Therefore, the contrast in colorfulness should always be positive. In general, it is advantageous to treat a self saliency and the corresponding relative saliency as separate features rather than combining them using certain heuristics. The influence of each feature will be determined separately by the training process, which will be described later.

$$colorfulness = saturation \quad (2)$$

$$contrast_{colorfulness} = \frac{\|saturation - saturation_{surrounding}\|}{saturation_{surrounding}} \quad (3)$$

brightness (a self-saliency feature) and contrast in brightness (a relative saliency feature)

In terms of brightness, the contrast between a bright object and a dark surrounding is almost as good as the contrast between a dark object and a bright surrounding. In particular, the main subject tends to be lit up in flash scenes.

$$brightness = luminance \quad (4)$$

$$contrast_{brightness} = \frac{|brightness - brightness_{surrounding}|}{brightness_{surrounding}} \quad (5)$$

texturefulness (a self-saliency feature) and contrast in texturefulness (a relative saliency feature)

In terms of texturefulness, in general, a large uniform region with very little texture tends to be the background. On the other hand, the contrast between a highly textured object and a nontextured or less textured surrounding is a good indication of main subjects. The same holds for a nontextured or less textured object and a highly textured surrounding.

$$texturefulness = texture\_energy \quad (6)$$

$$contrast_{texturefulness} = \frac{|texturefulness - texturefulness_{surrounding}|}{texturefulness_{surrounding}} \quad (7)$$

location (a self-saliency feature)

In terms of location, the main subject tends to be located near the center instead of the peripheral of the image, though not necessarily right in the center of the image. In fact, professional photographers tend to position the main subject at the horizontal gold partition positions.

Figure 4A:
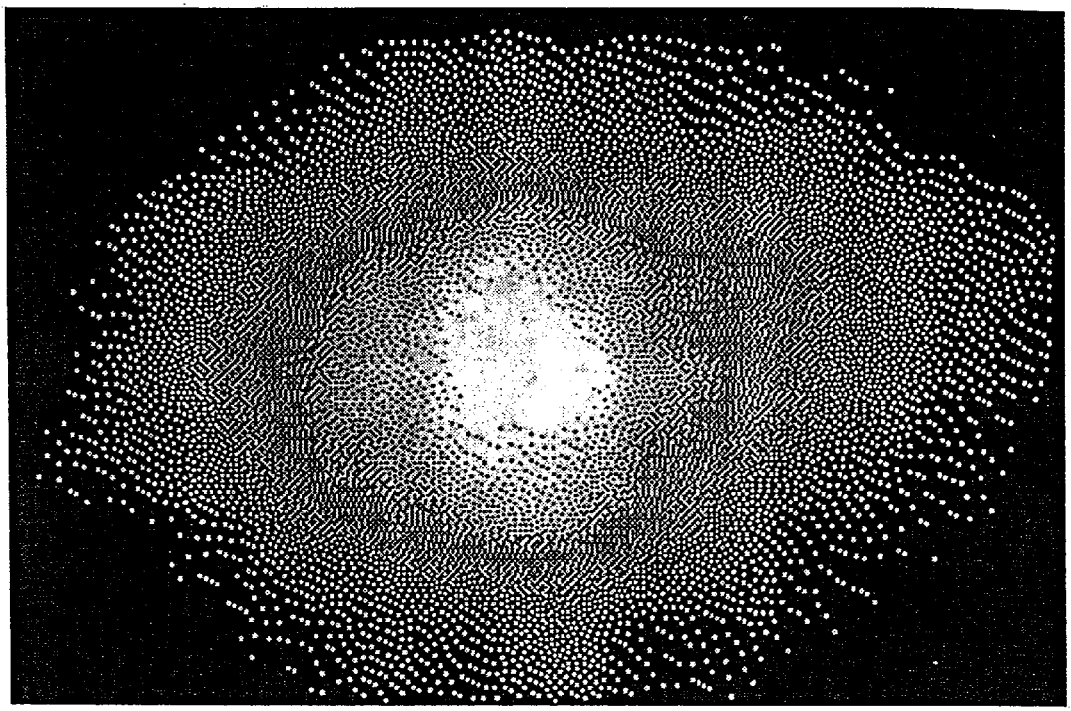
FIG. 4(a) is an illustration of the PDF in the form of a 2D function.
Figure 4B:
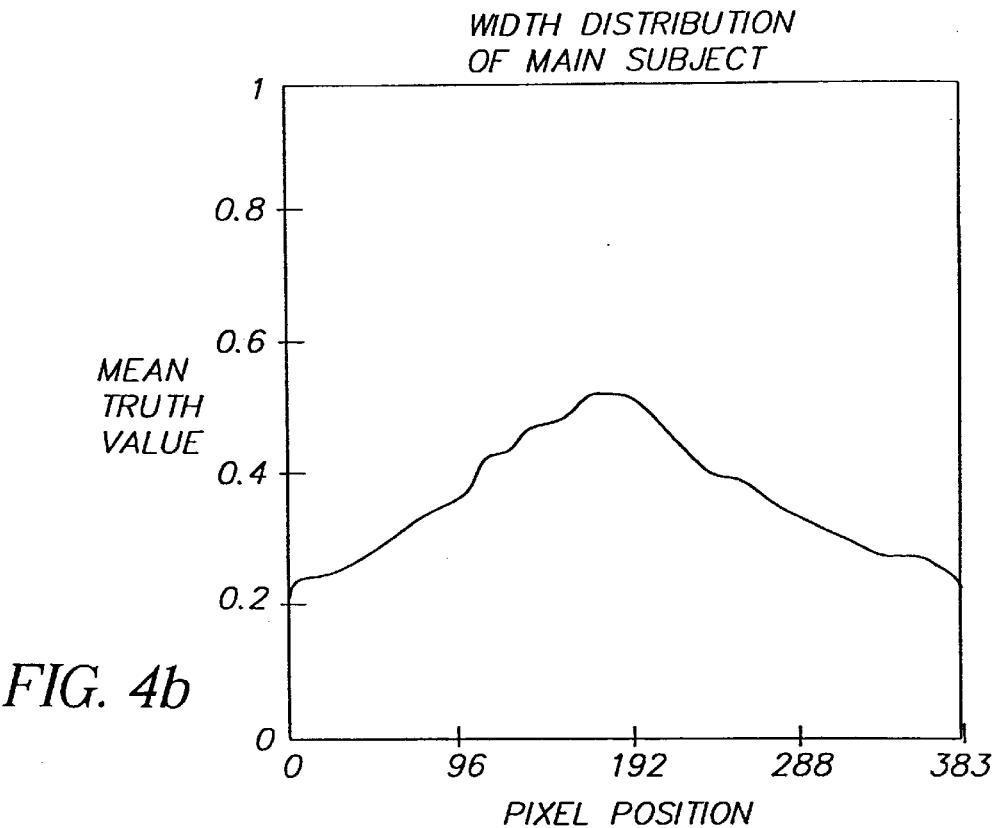
FIG. 4(b) is an illustration of the PDF in the form of its projection along the width direction.
Figure 4C:
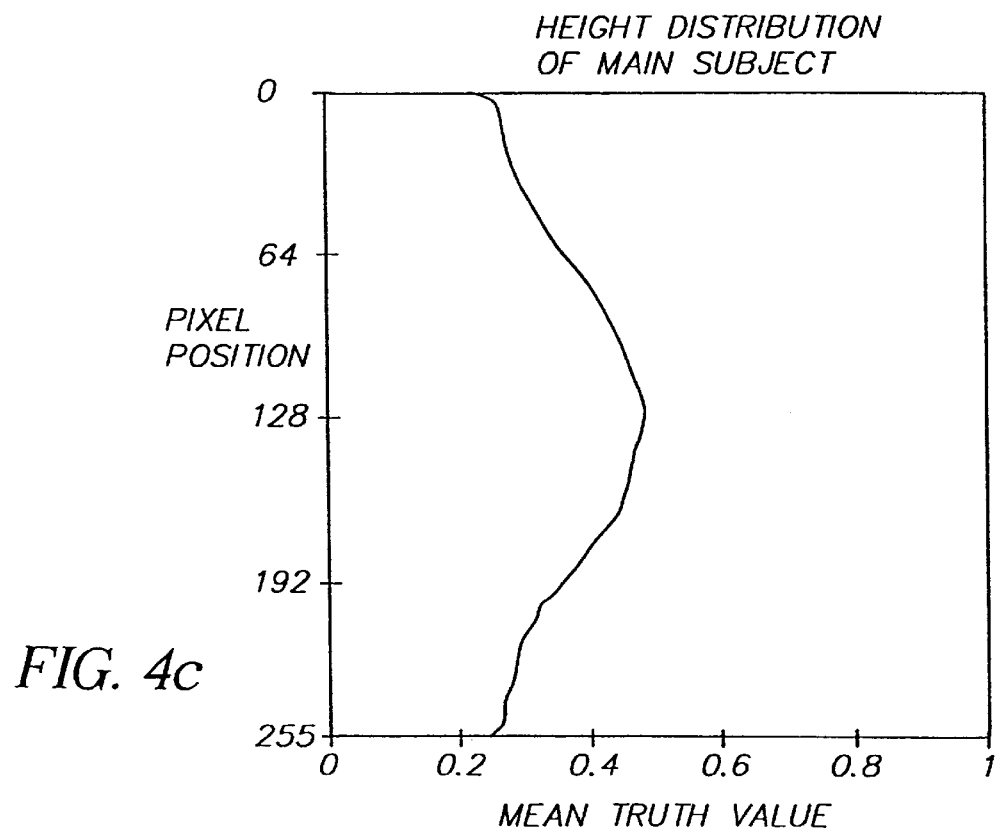
FIG. 4(c) is an illustration of the PDF in the form of its projection along the height direction.
Figure 5A:
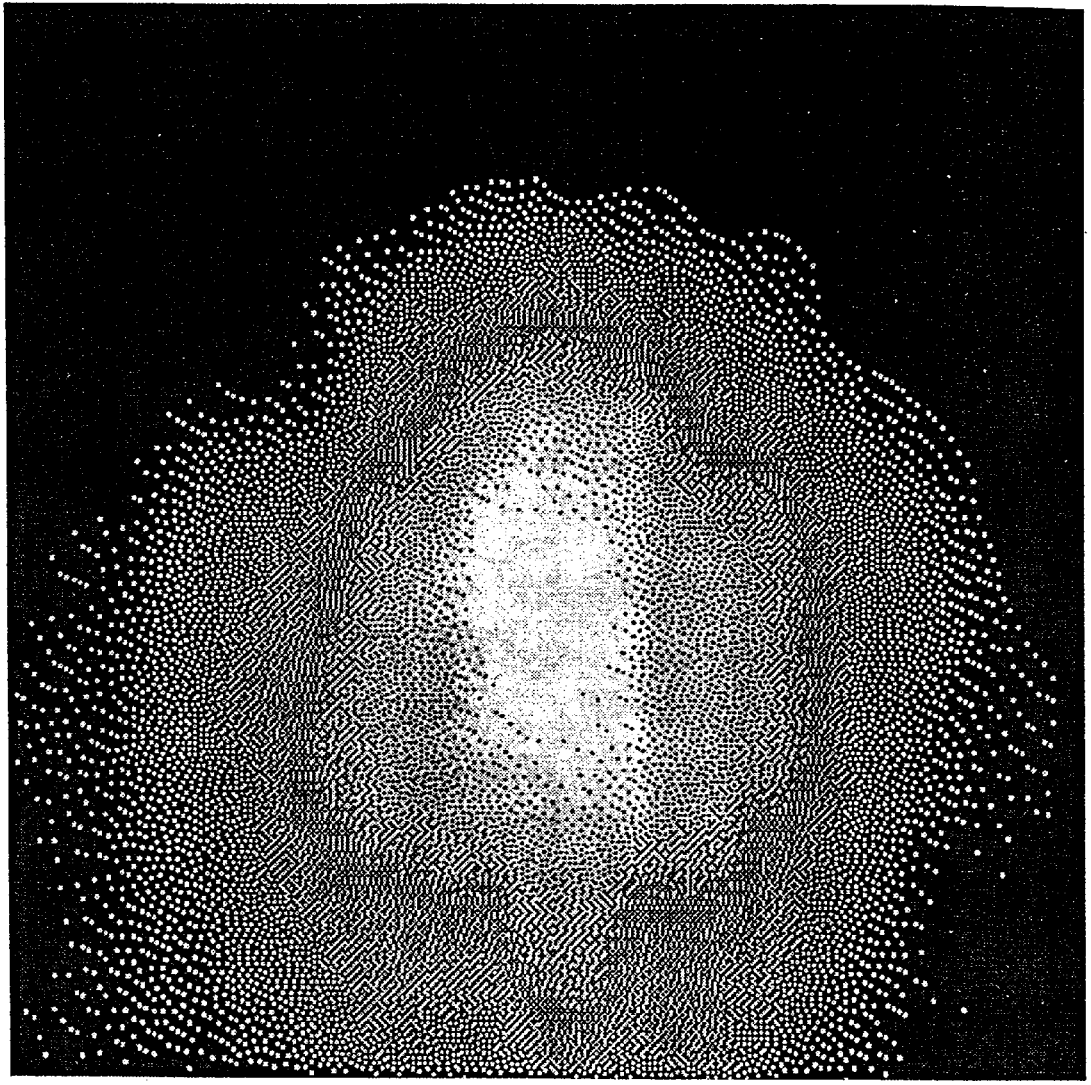
FIG. 5(a) is an illustration of the PDF in the form of a 2D function.
Figure 5B:
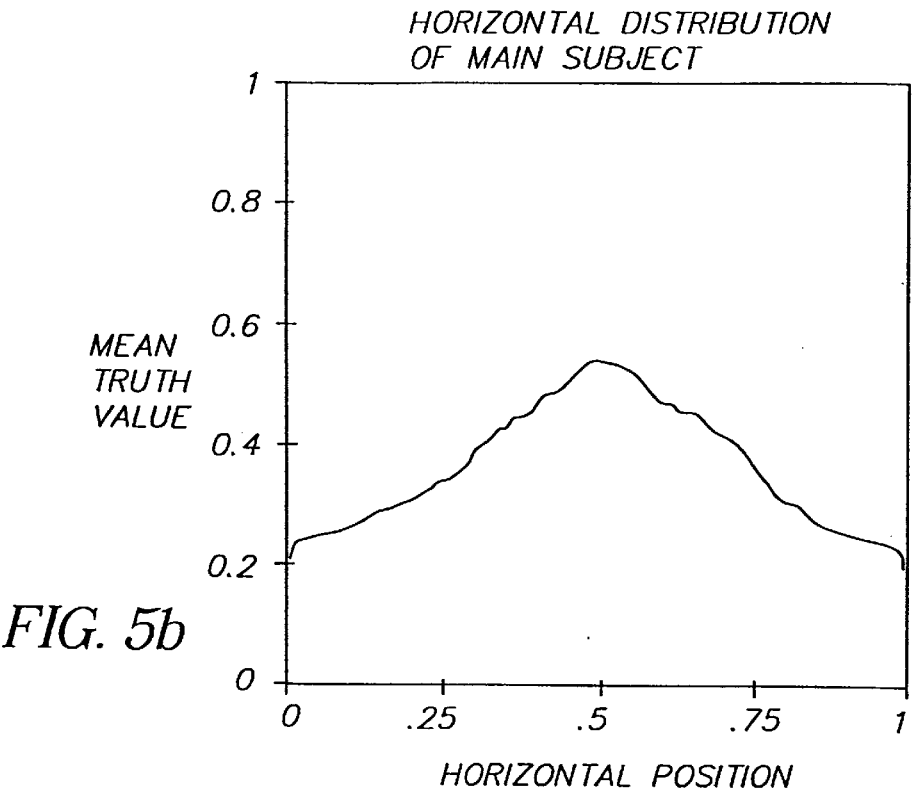
FIG. 5(b) is an illustration of the PDF in the form of its projection along the width direction.
Figure 5C:
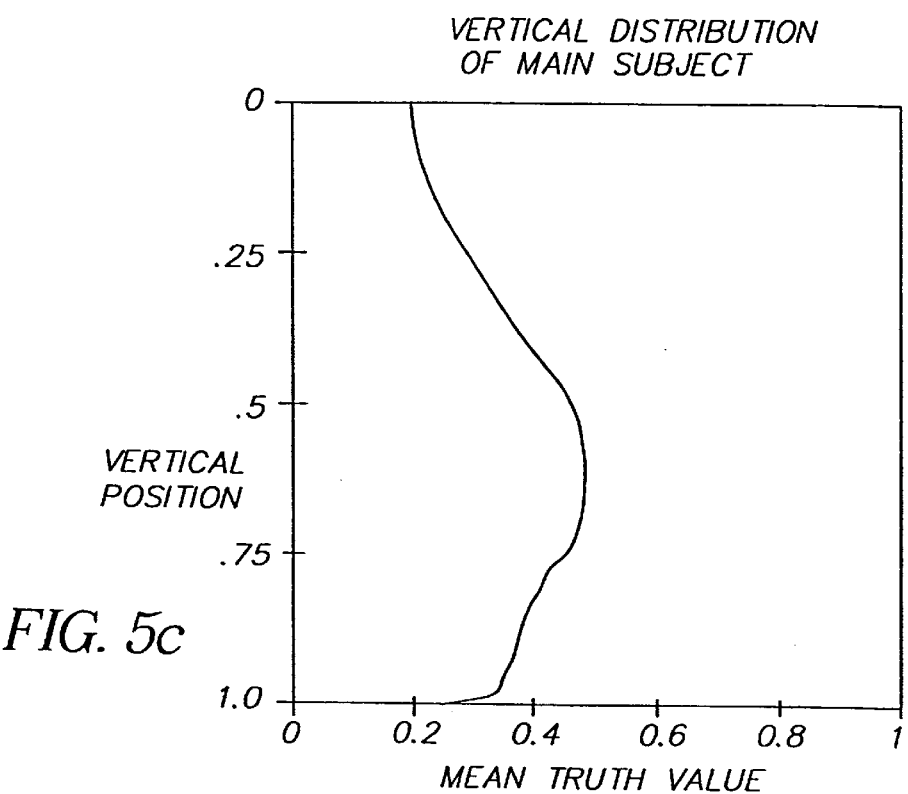
FIG. 5(c) is an illustration of the PDF in the form of its projection along the height direction.

The centroid of a region alone is usually not sufficient to indicate the location of the region without any indication of its size and shape. A centrality measure is defined by computing the integral of a probability density function (PDF) over the area of a given region. The PDF is derived from a set of training images, in which the main subject regions are manually outlined, by summing up the ground truth maps over the entire training set. In other words, the PDF represents the distribution of main subjects in terms of location. A more important advantage of this centrality measure is that every pixel of a given region, not just the centroid, contributes to the centrality measure of the region to a varying degree depending on its location.

$$centrality = \frac{1}{N_R} \sum_{(x,y) \in R} PDF_{MSD\_location}(x, y) \quad (8)$$

where (x,y) denotes a pixel in the region R, $N_R$ is the number of pixels in region R, and $PDF_{MSD\_location}$ denotes a 2D probability density function (PDF) of main subject location. If the orientation is unknown, the PDF is symmetric about the center of the image in both vertical and horizontal directions, which results in an orientation-independent centrality measure. An orientation-unaware PDF is shown in FIG. 4(a) and the projection in the width and height directions are also shown in FIG. 4(b) and FIG. 4(c), respectively. If the orientation is known, the PDF is symmetric about the center of the image in the horizontal direction but not in the vertical direction, which results in an orientation-aware centrality measure. An orientation-aware PDF is shown in FIG. 5(a) and the projection in the horizontal and vertical directions are also shown in FIG. 5(b) and FIG. 5(c), respectively.

size (a self-saliency feature)

Main subjects should have considerable but reasonable sizes. however, in most cases, very large regions or regions that span at least one spatial direction (for example, the horizontal direction) are most likely to be background regions, such as sky, grass, wall, snow, or water. In general, both very small and very large regions should be discounted.

$$size = \begin{cases} 0 & if\ s > s4 \\ 1 - \frac{s - s2}{s3 - s2} & if\ s > s3\ and\ s < s4 \\ 1 & if\ s > s2\ and\ s < s3 \\ \frac{s - s1}{s2 - s1} & if\ s > s1\ and\ s < s2 \\ 0 & if\ s < s1 \end{cases} \quad (9)$$

where s1, s2, s3, and s4 are predefined threshold (s1<s2<s3<s4).

In practice, the size of a region is measured as a fraction of the entire image size to achieve invariance to scaling.

$$size = \frac{region_{pixels}}{image_{pixels}} \quad (10)$$

In this invention, the region size is classified into one of three bins, labeled "small," "medium" and "large" using two thresholds s2 and s3, where s2<s3.

shape (a self-saliency feature) and contrast in shape (a relative saliency feature)

In general, objects that have distinctive geometry and smooth contour tend to be man-made and thus have high likelihood to be main subjects. For example, square, round, elliptic, or triangle shaped objects. In some cases, the contrast in shape indicates conspicuity (for example, a child among a pool of bubble balls).

The shape features are divided into two categories, self salient and relatively salient. Self salient features characterize the shape properties of the regions themselves and relatively salient features characterize the shape properties of the regions in comparison to those of neighboring regions.

The aspect ratio of a region is the major axis/minor axis of the region. A Gaussian belief function maps the aspect ratio to a belief value. This feature detector is used to discount long narrow shapes from being part of the main subject.

Three different measures are used to characterize the convexity of a region: (1) perimeter-based—perimeter of the convex hull divided by the perimeter of region; (2) area-based—area of region divided by the area of the convex hull; and (3) hyperconvexity—the ratio of the perimeter-based convexity and area-based convexity. In general, an object of complicated shape has a hyperconvexity greater than 1.0. The three convexity features measure the compactness of the region. Sigmoid belief functions are used to map the convexity measures to beliefs.

The rectangularity is the area of the MBR of a region divided by the area of the region. A sigmoid belief function maps the rectangularity to a belief value. The circularity is the square of the perimeter of the region divided by the area of region. A sigmoid belief function maps the circularity to a belief value.

Relative shape-saliency features include relative rectangularity, relative circularity and relative convexity. In particular, each of these relative shape features is defined as the average difference between the corresponding self salient shape feature of the region and those of the neighborhood regions, respectively. Finally, a Gaussian function is used to map the relative measures to beliefs.

symmetry (a self-saliency feature)

Objects of striking symmetry, natural or artificial, are also likely to be of great interest. Local symmetry can be computed using the method described by V. D. Gesu, et al., "Local operators to detect regions of interest," *Pattern Recognition Letters*, vol. 18, pp. 1077–1081, 1997.

spatial relationship (a relative saliency feature)

In general, main subjects tend to be in the foreground. Consequently, main subjects tend to share boundaries with a lot of background regions (background clutter), or be enclosed by large background regions such as sky, grass, snow, wall and water, or occlude other regions. These characteristics in terms of spatial relationship may reveal the region of attention. Adjacency, surroundedness and occlusion are the main features in terms of spatial relationship. In many cases, occlusion can be inferred from T-junctions (L. R. Williams, "Perceptual organization of occluding contours," in *Proc. IEEE Int. Conf Computer Vision*, 1990) and fragments can be grouped based on the principle of perceptual occlusion (J. August, et al., "Fragment grouping via the principle of perceptual occlusion," in *Proc. IEEE Int. Conf Pattern Recognition*, 1996).

In particular, a region that is nearly completely surrounded by a single other region is more likely to be the main subject. Surroundedness is measured as the maximum fraction of the region's perimeter that is shared with any one neighboring region. A region that is totally surrounded by a single other region has the highest possible surroundedness value of 1.0.

$$surroundedness = \max_{neighbors} \frac{length\_of\_common\_border}{region\_perimeter} \quad (11)$$

borderness (a self-saliency feature)

Many background regions tend to contact one or more of the image borders. In other words, a region that has significant amount of its contour on the image borders tends to belong to the background. The percentage of the contour points on the image borders and the number of image borders shared (at most four) can be good indications of the background.

In the case where the orientation is unknown, one borderness feature places each region in one of six categories determined by the number and configuration of image borders the region is "in contact" with. A region is "in contact" with a border when at least one pixel in the region falls within a fixed distance of the border of the image. Distance is expressed as a fraction of the shorter dimension of the image. The six categories for bordemess_a are defined in Table 1.

TABLE 1

Categories for orientation-independent borderness_a.

| Category | The region is in contact with ... |
|---|---|
| 0 | none of the image borders |
| 1 | exactly one of the image borders |
| 2 | exactly two of the image borders, adjacent to one another |
| 3 | exactly two of the image borders, opposite to one another |

TABLE 1-continued

Categories for orientation-independent borderness_a.

| Category | The region is in contact with ... |
|---|---|
| 4 | exactly three of the image borders |
| 5 | exactly four (all) of the image borders |

Knowing the proper orientation of the image allows us to refine the borderness feature to account for the fact that regions in contact with the top border are much more likely to be background than regions in contact with the bottom. This feature places each region in one of 12 categories determined by the number and configuration of image borders the region is "in contact" with, using the definition of "in contact with" from above. The four borders of the image are labeled as "Top", "Bottom", "Left", and "Right" according to their position when the image is oriented with objects in the scene standing upright. In this case, the twelve categories for borderness_b are defined in Table 2, which lists each possible combination of borders a region may be in contact with, and gives the category assignment for that combination.

TABLE 2

Categories for orientation-dependent borderness_a.

| The region is in contact with ... | | | | Category |
|---|---|---|---|---|
| Top | Bottom | Left | Right | Category |
| N | N | N | N | 0 |
| N | Y | N | N | 1 |
| Y | N | N | N | 2 |
| N | N | Y | N | 3 |
| N | N | N | Y | 3 |
| N | Y | Y | N | 4 |
| N | Y | N | Y | 4 |
| Y | N | N | N | 5 |
| Y | N | N | N | 5 |
| Y | Y | N | N | 6 |
| N | N | Y | Y | 7 |
| N | Y | Y | Y | 8 |
| Y | Y | Y | N | 9 |
| Y | Y | N | Y | 9 |
| Y | N | Y | Y | 10 |
| Y | Y | Y | Y | 11 |

Regions that include a large fraction of the image border are also likely to be background regions. This feature indicates what fraction of the image border is in contact with the given region.

$$borderness\_b = \frac{perimeter\_pixels\_in\_this\_region}{2*(image\_height + image\_width - 2)} \quad (12)$$

When a large fraction of the region perimeter is on the image border, a region is also likely to be background. Such a ratio is unlikely to exceed 0.5, so a value in the range [0,1] is obtained by scaling the ratio by a factor of 2 and saturating the ratio at the value of 1.0.

$$borderness\_c = \frac{\min(1, 2*num\_region\_perimeter\_pixels\_on\_border)}{region\_perimeter} \quad (13)$$

Again, note that instead of a composite borderness measure based on heuristics, all the above three borderness measures are separately trained and used in the main subject detection.

Semantic Saliency Features flesh/face/people (foreground, self saliency features)

A majority of photographic images have people and about the same number of images have sizable faces in them. In conjunction with certain shape analysis and pattern analysis, some detected flesh regions can be identified as faces. Subsequently, using models of human figures, flesh detection and face a detection can lead to clothing detection and eventually people detection.

The current flesh detection algorithm utilizes color image segmentation and a pre-determined flesh distribution in a chrominance space (Lee, "Color image quantization based on physics and psychophysics," Journal of Society of Photographic Science and Technology of Japan, Vol. 59, No. 1, pp. 212–225, 1996). The flesh region classification is based on Maximum Likelihood Estimation (MLE) according to the average color of a segmented region. The conditional probabilities are mapped to a belief value via a sigmoid belief function.

A primitive face detection algorithm is used in the present invention. It combines the flesh map output by the flesh detection algorithm with other face heuristics to output a belief in the location of faces in an image. Each region in an image that is identified as a flesh region is fitted with an ellipse. The major and minor axes of the ellipse are calculated as also the number of pixels in the region outside the ellipse and the number of pixels in the ellipse not part of the region. The aspect ratio is computed as a ratio of the major axis to the minor axis. The belief for the face is a function of the aspect ratio of the fitted ellipse, the area of the region outside the ellipse, and the area of the ellipse not part of the region. A Gaussian belief sensor function is used to scale the raw function outputs to beliefs.

It will be appreciated that a person of ordinary skill in the art can use a different face detection method without departing from the present invention.

key background subject matters (self saliency features)

There are a number of objects that frequently appear in photographic images, such as sky, cloud, grass, tree, foliage, vegetation, water body (river, lake, pond), wood, metal, and the like. Most of them have high likelihood to be background objects. Therefore, such objects can be ruled out while they also serve as precursors for main subjects as well as scene types.

Among these background subject matters, sky and grass (may include other green vegetation) are detected with relatively high confidence due to the amount of constancy in terms of their color, texture, spatial extent, and spatial location.

Probabilistic Reasoning

All the saliency features are integrated by a Bayes net to yield the likelihood of main subjects. On one hand, different evidences may compete with or contradict each other. On the other hand, different evidences may mutually reinforce each other according to prior models or knowledge of typical photographic scenes. Both competition and reinforcement are resolved by the Bayes net-based inference engine.

A Bayes net (J. Pearl, *Probabilistic Reasoning in Intelligent Systems*, San Francisco, Calif.: Morgan Kaufmann, 1988) is a directed acyclic graph that represents causality relationships between various entities in the graph. The direction of links represents causality. It is an evaluation means knowing joint Probability Distribution Function (PDF) among various entities. Its advantages include explicit uncertainty characterization, fast and efficient computation, quick training, high adaptivity and ease of building, and representing contextual knowledge in human reasoning framework. A Bayes net consists of four components:

1. Priors: The initial beliefs about various nodes in the Bayes net
2. Conditional Probability Matrices (CPMs): the statistical relationship between two connected nodes in the Bayes net
3. Evidences: Observations from feature detectors that are input to the Bayes net
4. Posteriors: The final computed beliefs after the evidences have been propagated through the Bayes net.

Figure 7:
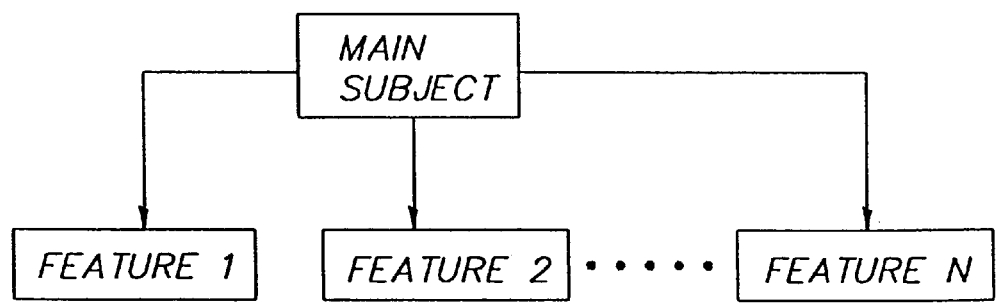
FIG. 7 is an illustration of a two level Bayes net used in the present invention; and, FIG. 8 is block diagram of a preferred segmentation method.

Referring to FIG. 7, a two-level Bayesian net is used in the present invention that assumes conditional independence between various feature detectors. The main subject is determined at the root node 20 and all the feature detectors are at the leaf nodes 22. There is one Bayes net active for each region (identified by the segmentation algorithm) in the image. The root node gives the posterior belief in that region being part of the main subject. It is to be understood that the present invention can be used with a Bayes net that has more than two levels without departing from the scope of the present invention.

Training Bayes Nets

One advantage of Bayes nets is each link is assumed to be independent of links at the same level. Therefore, it is convenient for training the entire net by training each link separately, i.e., deriving the CPM for a given link independent of others. In general, two methods are used for obtaining CPM for each root-feature node pair:

1. Using Expert Knowledge

This is an ad-hoc method. An expert is consulted to obtain the conditional probabilities of each feature detector observing the main subject given the main subject.

2. Using Contingency Tables

This is a sampling and correlation method. Multiple observations of each feature detector are recorded along with information about the main subject. These observations are then compiled together to create contingency tables which, when normalized, can then be used as the CPM. This method is similar to neural network type of training (learning). This method is preferred in the present invention.

Consider the CPM for centrality as an example. This matrix was generated using contingency tables derived from the ground truth and the feature detector. Since the feature detector in general does not supply a binary decision (referring to Table 3), fractional frequency count is used in deriving the CPM. The entries in the CPM are determined by $$CPM = \left[ \left( \sum_{i \in I} \sum_{r \in R_i} n_i F_r^T T_r \right) P \right]^T \tag{14}$$

$$F_r = [f_0^r f_1^r \ldots f_M^r],$$

$$T_r = [t_0^r t_1^r \ldots t_L^r],$$

$$P = diag\{p_j\},$$

$$p_j = \left( \sum_{i \in I} \sum_{r \in R_i} n_i t_r \right),$$

where I is the set of all training images, $R_i$ is the set of all regions in image i, $n_i$ is the number of observations (observers) for image i. Moreover, $F_r$ represents an M-label feature vector for region r, $T_r$ represents an L-level ground-truth vector, and P denotes an L×L diagonal matrix of normalization constant factors. For example, in Table 3, regions 1, 4, 5 and 7 contribute to boxes 00, 11, 10 and 01 in Table 4, respectively. Note that all the belief values have been normalized by the proper belief sensors. As an intuitive interpretation of the first column of the CPM for centrality, a "central" region is about twice as likely to be the main subject than not a main subject.

TABLE 3

An example of training the CPM.

| Region Number | Ground Truth | Feature Detector Output | Contribution |
|---|---|---|---|
| 1 | 0 | 0.017 | 00 |
| 2 | 0 | 0.211 | 00 |
| 3 | 0 | 0.011 | 00 |
| 4 | 0.933 | 0.953 | 11 |
| 5 | 0 | 0.673 | 10 |
| 6 | 1 | 0.891 | 11 |
| 7 | 0.93 | 0.072 | 01 |
| 8 | 1 | 0.091 | 01 |

TABLE 4

The trained CPM.

|  | Feature = 1 | feature = 0 |
|---|---|---|
| Main subject = 1 | 0.35 (11) | 0.65 (01) |
| Main subject = 0 | 0.17 (10) | 0.83 (00) |

The output of the algorithm is in the form of a list of segmented regions ranked in a descending order of their likelihood as potential main subjects for a generic or specific application. Furthermore, this list can be converted into a map in which the brightness of a region is proportional to the main subject belief of the region. This "belief" map is more than a binary map that only indicates location of the determined main subject. The associated likelihood is also attached to each region so that the regions with large brightness values correspond to regions with high confidence or belief being part of the main subject. This reflects the inherent uncertainty for humans to perform such a task. However, a binary decision, when desired, can be readily obtained by applying an appropriate threshold to the belief map. Moreover, the belief information may be very useful for downstream applications. For example, different weighting factors can be assigned to different regions in determining bit allocation for image coding.

What is claimed is:

1. A method for detecting a main subject in an image, the method comprising the steps of:
    a) receiving a digital image;
    b) extracting regions of arbitrary shape and size defined by actual objects from the digital image;
    c) extracting for each of the regions at least one structural saliency feature and at least one semantic saliency feature; and,
    d) integrating the structural saliency feature and the semantic feature using a probabilistic reasoning engine into an estimate of a belief that each region is the main subject.

2. The method as in claim 1, wherein step (b) includes using a color distance metric defined in a color space, a spatial homogeneity constraint, and a mechanism for permitting spatial adaptivity.

3. The method as in claim 1, wherein the structural saliency feature of step (c) includes at least one of a low-level vision feature and a geometric feature.

4. The method as in claim 1, wherein step (c) includes using either individually or in combination a color, brightness and/or texture as a low-level vision feature; a location, size, shape, convexity, aspect ratio, symmetry, borderness, surroundedness and/or occlusion as a geometric feature; and a flesh, face, sky, grass and/or other green vegetation as the semantic saliency feature.

5. The method as in claim 1, wherein step (d) includes using a collection of human opinions to train the reasoning engine to recognize the relative importance of the saliency features.

6. The method as in claim 1, wherein step (c) includes using either individually or in combination a self-saliency feature and a relative saliency feature as the structural saliency feature.

7. The method as in claim 6, wherein step (c) includes using an extended neighborhood window to compute a plurality of the relative saliency features, wherein the extended neighborhood window is determined by the steps of:
    (c1) finding a minimum bounding rectangle of a region;
    (c2) stretching the minimum bounding rectangle in all four directions proportionally; and
    (c3) defining all regions intersecting the stretched minimum bounding rectangle as neighbors of the region.

8. The method as in claim 4, wherein step (c) includes using a centrality as the location feature, wherein the centrality feature is computed by the steps of:
    (c1) determining a probability density function of main subject locations using a collection of training data;
    (c2) computing an integral of the probability density function over an area of a region; and,
    (c3) obtaining a value of the centrality feature by normalizing the integral by the area of the region.

9. The method as in claim 4, wherein step (c) includes using a hyperconvexity as the convexity feature, wherein the hyperconvexity feature is computed as a ratio of a perimeter-based convexity measure and an area-based convexity measure.

10. The method as in claim 4, wherein step (c) includes computing a maximum fraction of a region perimeter shared with a neighboring region as the surroundedness feature.

11. The method as in claim 4, wherein step (c) includes using an orientation-unaware borderness feature as the borderness feature, wherein the orientation-unaware borderness feature is categorized by the number and configuration of image borders a region is in contact with, and all image borders are treated equally.

12. The method as in claim 4, wherein step (c) includes using an orientation-aware borderness feature as the borderness feature, wherein the orientation-aware borderness feature is categorized by the number and configuration of image borders a region is in contact with, and each image border is treated differently.

13. The method as in claim 4, wherein step (c) includes using the borderness feature that is determined by what fraction of an image border is in contact with a region.

14. The method as in claim 4, wherein step (c) includes using the borderness feature that is determined by what fraction of a region border is in contact with an image border.

15. The method as in claim 1, wherein step (d) includes using a Bayes net as the reasoning engine.

16. The method as in claim 1, wherein step (d) includes using a conditional probability matrix that is determined by using fractional frequency counting according to a collection of training data.

17. The method as in claim 1, wherein step (d) includes using a belief sensor function to convert a measurement of a feature into evidence, which is an input to a Bayes net.

18. The method as in claim 1, wherein step (d) includes outputting a belief map, which indicates a location of and a belief in the main subject.

19. A method for detecting a main subject in an image, the method comprising the steps of:

a) receiving a digital image;

b) extracting regions of arbitrary shape and size defined by actual objects from the digital image;

c) grouping the regions into larger segments corresponding to physically coherent objects;

d) extracting for each of the regions at least one structural saliency feature and at least one semantic saliency feature; and, e) integrating the structural saliency feature and the semantic feature using a probabilistic reasoning engine into an estimate of a belief that each region is the main subject.

20. The method as in claim 19, wherein step (b) includes using a color distance metric defined in a color space, a spatial homogeneity constraint, and a mechanism for permitting spatial adaptivity.

21. The method as in claim 19, wherein step (c) includes using either individually or in combination non-purposive grouping and purposive grouping.

22. The method as in claim 19, wherein step (d) includes using either individually or in combination at least one low-level vision feature and at least one geometric feature as the structural saliency feature.

23. The method as in claim 19, wherein step (d) includes using either individually or in combination a color, brightness and/or texture as a low-level vision feature; a location, size, shape, convexity, aspect ratio, symmetry, borderness, surroundedness and/or occlusion as a geometric feature; and a flesh, face, sky, grass and/or other green vegetation as the semantic saliency feature.

24. The method as in claim 19, wherein step (e) includes using a collection of human opinions to train the reasoning engine to recognize the relative importance of the saliency features.

25. The method as in claim 19, wherein step (d) includes using either individually or in combination a self-saliency feature and a relative saliency feature as the structural saliency feature.

26. The method as in claim 25, wherein step (d) includes using an extended neighborhood window to compute a plurality of the relative saliency features, wherein the extended neighborhood window is determined by the steps of:

(c1) finding a minimum bounding rectangle of a region;

(c2) stretching the minimum bounding rectangle in all four directions proportionally; and, (c3) defining all regions intersecting the stretched minimum bounding rectangle as neighbors of the region.

27. The method as in claim 23, wherein step (d) includes using a centrality as the location feature, wherein the centrality feature is computed by the steps of:

(c1) determining a probability density function of main subject locations using a collection of training data;

(c2) computing an integral of the probability density function over an area of a region; and, (c3) obtaining a value of the centrality feature by normalizing the integral by the area of the region.

28. The method as in claim 23, wherein step (d) includes using a hyperconvexity as the convexity feature, wherein the hyperconvexity feature is computed as a ratio of a perimeter-based convexity measure and an area-based convexity measure.

29. The method as in claim 23, wherein step (d) includes computing a maximum fraction of a region perimeter shared with a neighboring region as the surroundedness feature.

30. The method as in claim 23, wherein step (d) includes using an orientation-unaware borderness feature as the borderness feature, wherein the orientation-unaware borderness feature is categorized by the number and configuration of image borders a region is in contact with, and all image borders are treated equally.

31. The method as in claim 23, wherein step (d) includes using an orientation-aware borderness feature as the borderness feature, wherein the orientation-aware borderness feature is categorized by the number and configuration of image borders a region is in contact with, and each image border is treated differently.

32. The method as in claim 23, wherein step (d) includes using the borderness feature that is determined by what fraction of an image border is in contact with a region.

33. The method as in claim 23, wherein step (d) includes using the borderness feature that is determined by what fraction of a region border is in contact with an image border.

34. The method as in claim 19, wherein step (e) includes using a Bayes net as the reasoning engine.

35. The method as in claim 19, wherein step (e) includes using a conditional probability matrix that is determined by using fractional frequency counting according to a collection of training data.

36. The method as in claim 19, wherein step (e) includes using a belief sensor function to convert a measurement of a feature into evidence, which is an input to a Bayes net.

37. The method as in claim 19, wherein step (e) includes outputting a belief map, which indicates a location of and a belief in the main subject.

* * * * *